(12) United States Patent
Ottesen et al.

(10) Patent No.: US 7,694,224 B2
(45) Date of Patent: Apr. 6, 2010

(54) LOCATION PREDICATIVE RESTORATION OF COMPRESSED IMAGES STORED ON A HARD DISK DRIVE WITH SOFT AND HARD ERRORS

(75) Inventors: Hal Hjalmar Ottesen, Rochester, MN (US); Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1952 days.

(21) Appl. No.: 09/870,803

(22) Filed: May 31, 2001

(65) Prior Publication Data

US 2003/0164846 A1 Sep. 4, 2003

(51) Int. Cl.
*G06F 3/00* (2006.01)
*G06F 12/00* (2006.01)

(52) U.S. Cl. .................. 715/721; 715/723; 711/112
(58) Field of Classification Search .............. 345/723, 345/644, 540, 544, 643; 714/701; 715/766, 715/811, 810, 723, 711, 721
See application file for complete search history.

(56) References Cited

U.S. PATENT DOCUMENTS

| 5,053,861 | A | | 10/1991 | Tsai et al. ............... 358/13 |
|---|---|---|---|---|
| 5,065,229 | A | | 11/1991 | Tsai et al. ............... 358/21 |
| 5,168,375 | A | | 12/1992 | Reisch et al. ........... 358/432 |
| 5,398,079 | A | | 3/1995 | Liu et al. ................ 348/699 |
| 5,617,333 | A | * | 4/1997 | Oyamada et al. ........ 709/247 |
| 5,621,467 | A | | 4/1997 | Chien et al. ............. 348/409 |
| 5,671,020 | A | * | 9/1997 | Law ........................ 348/608 |
| 5,739,873 | A | * | 4/1998 | Kondo ..................... 348/720 |
| 5,748,770 | A | | 5/1998 | Hajjahmad et al. ...... 382/167 |
| 5,809,041 | A | * | 9/1998 | Shikakura et al. ....... 714/747 |
| 5,883,823 | A | * | 3/1999 | Ding ...................... 708/402 |
| 5,943,444 | A | | 8/1999 | Shimizu et al. ......... 382/236 |
| 5,963,210 | A | | 10/1999 | Lewis et al. ............ 345/419 |
| 5,987,176 | A | * | 11/1999 | Imaizumi et al. ........ 382/232 |
| 6,025,854 | A | * | 2/2000 | Hinz et al. .............. 345/538 |
| 6,115,507 | A | | 9/2000 | Eglit et al. .............. 382/300 |
| 6,449,312 | B1 | * | 9/2002 | Zhang et al. ........ 375/240.16 |
| 6,549,207 | B1 | * | 4/2003 | Matsumoto ............. 345/473 |
| 6,549,575 | B1 | * | 4/2003 | Butter et al. ........ 375/240.16 |

OTHER PUBLICATIONS

Microsoft, Microsoft Computer Dictionary, 2002, Microsoft Press, Fifth Edition, p. 192.*

* cited by examiner

*Primary Examiner*—Dennis Bonshock
(74) *Attorney, Agent, or Firm*—Patterson & Sheridan, LLP

(57) ABSTRACT

Method, apparatus and signal bearing medium for processing multimedia data which improve server performance in rendering multimedia data. In one aspect, a method is provided for processing multimedia data without requiring utilization of the hard disk drive's data recovery procedure when soft or hard errors are encountered in connection with reading of the multimedia data from the hard disk drive. The method for processing multimedia data comprises: indexing the multimedia data to an i by j matrix; storing the i by j matrix in a data storage device utilizing odd/even index sequencing of the i by j matrix; retrieving data from the data storage device; and reconstructing the i by j matrix utilizing odd/even index sequencing of retrieved data.

28 Claims, 11 Drawing Sheets

| (1,1) | (1,2) | (1,3) | (1,4) | (1,5) | --- | 1,j-1 | 1,j |
|---|---|---|---|---|---|---|---|
| (2,1) | (2,2) | (2,3) | (2,4) | (2,5) | --- | 2,j-1 | 2,j |
| (3,1) | (3,2) | (3,3) | (3,4) | (3,5) | --- | 3,j-1 | 3,j |
| (4,1) | (4,2) | (4,3) | (4,4) | (4,5) | --- | 4,j-1 | 4,j |
| (5,1) | (5,2) | (5,3) | (5,5) | (5,5) | --- | 5,j-1 | 5,j |
| ⋮ | ⋮ | ⋮ | ⋮ | ⋮ | ⋮ | ⋮ | ⋮ |
| i-1,1 | i-1,2 | i-1,3 | i-1,4 | i-1,5 | --- | i-1,j-1 | i-1,j |
| i,1 | i,2 | i,3 | i,4 | i,5 | --- | i,j-1 | i,j |

| (1,1) | | (1,3) | | (1,5) | ... | 1,j-1 | |
|---|---|---|---|---|---|---|---|
| | | | | | | | |
| (3,1) | | (3,3) | | (3,5) | ... | 3,j-1 | |
| | | | | | | | |
| (5,1) | | (5,3) | | (5,5) | ... | 5,j-1 | |
| ⋮ | | ⋮ | | ⋮ | | ⋮ | |
| i-1,1 | | i-1,3 | | i-1,5 | ... | i-1,j-1 | |
| | | | | | | | |

*Fig. 4A*

| | (1,2) | | (1,4) | | ... | | 1,j |
|---|---|---|---|---|---|---|---|
| | | | | | | | 2,j |
| | (3,2) | | (3,4) | | ... | | |
| | | | | | | | |
| | (5,2) | | (5,5) | | ... | | 5,j |
| | ⋮ | | ⋮ | | | | ⋮ |
| | i-1,2 | | i-1,4 | | ... | | i-1,j |
| | | | | | | | |

*Fig. 4B*

| | | | | | | | |
|---|---|---|---|---|---|---|---|
| (2,1) | | (2,3) | | (2,5) | . . . | 2,j-1 | |
| | | | | | | | |
| (4,1) | | (4,3) | | (4,5) | . . . | 4,j-1 | |
| | | | | | | | |
| ⋮ | | ⋮ | | ⋮ | | ⋮ | |
| | | | | | | | |
| i,1 | | i,3 | | i,5 | . . . | i,j-1 | |

Fig. 4C

| | | | | | | | |
|---|---|---|---|---|---|---|---|
| | (2,2) | | (2,4) | | . . . | | 2,j |
| | | | | | | | |
| | (4,2) | | (4,4) | | . . . | | 4,j |
| | | | | | | | |
| | ⋮ | | ⋮ | | | | ⋮ |
| | | | | | | | |
| | i,2 | | i,4 | | . . . | | i,j |

Fig. 4D

|   |   |   |   |   |   |   |   |   |   |   |
|---|---|---|---|---|---|---|---|---|---|---|
| 171 | 180 | 61 | 15 | 14 | 13 | 13 | 14 | 13 | 12 |   |
| 172 | X | X | X | X | X | X | X | X | 13 |   |
| 172 | X | X | X | X | X | X | X | X | 14 |   |
| 169 | X | X | X | X | X | X | X | X | 17 |   |
| 171 | X | X | X | X | X | X | X | X | 16 |   |
| 167 | X | X | X | X | X | X | X | X | 12 |   |
| 169 | X | X | X | X | X | X | X | X | 10 |   |
| 171 | X | X | X | X | X | X | X | X | 9 |   |
| 168 | X | X | X | X | X | X | X | X | 9 |   |
| 166 | 169 | 170 | 170 | 76 | 12 | 10 | 10 | 10 | 10 |   |

| 12 | 13 | 14 | 13 | 13 | 14 | 15 | 61 | 180 | 171 |
|---|---|---|---|---|---|---|---|---|---|
| 14 | 30 | 46 | 61 | 77 | 93 | 109 | 125 | 140 | 172 |
| 17 | 33 | 48 | 64 | 79 | 95 | 110 | 126 | 141 | 172 |
| 16 | 31 | 47 | 62 | 77 | 93 | 108 | 123 | 138 | 169 |
| 12 | 28 | 44 | 60 | 76 | 92 | 107 | 123 | 139 | 171 |
| 10 | 26 | 41 | 57 | 73 | 89 | 104 | 120 | 136 | 167 |
| 9 | 25 | 41 | 57 | 73 | 89 | 105 | 121 | 137 | 169 |
| 9 | 25 | 41 | 58 | 74 | 90 | 106 | 122 | 139 | 171 |
| 10 | 26 | 42 | 57 | 73 | 89 | 105 | 121 | 136 | 168 |
| 10 | 10 | 10 | 10 | 12 | 76 | 170 | 170 | 169 | 166 |

| 171 | 180 | 61 | 15 | 14 | 13 | 13 | 14 | 13 | 12 |
|---|---|---|---|---|---|---|---|---|---|
| 172 | 178 | 83 | 46 | 26 | 13 | 12 | 13 | 12 | 14 |
| 172 | 177 | 94 | 62 | 33 | 13 | 12 | 13 | 12 | 17 |
| 169 | 176 | 105 | 77 | 39 | 13 | 12 | 12 | 12 | 16 |
| 171 | 175 | 116 | 93 | 45 | 13 | 12 | 12 | 12 | 12 |
| 167 | 173 | 126 | 108 | 51 | 12 | 11 | 12 | 11 | 10 |
| 169 | 172 | 137 | 124 | 57 | 12 | 11 | 11 | 11 | 9 |
| 171 | 171 | 148 | 139 | 64 | 12 | 11 | 11 | 11 | 9 |
| 168 | 170 | 159 | 155 | 70 | 12 | 10 | 10 | 10 | 10 |
| 166 | 169 | 170 | 170 | 76 | 12 | 10 | 10 | 10 | 10 |

*Fig. 7C*

| 171 | 180 | 61 | 15 | 14 | 13 | 13 | 14 | 13 | 12 |
|---|---|---|---|---|---|---|---|---|---|
| 172 | 159 | 104 | 78 | 60 | 45 | 37 | 30 | 21 | 14 |
| 172 | 159 | 110 | 86 | 64 | 46 | 38 | 31 | 23 | 17 |
| 169 | 157 | 114 | 93 | 66 | 45 | 37 | 30 | 22 | 16 |
| 171 | 157 | 120 | 100 | 69 | 45 | 36 | 12 | 20 | 12 |
| 167 | 155 | 123 | 106 | 70 | 43 | 34 | 27 | 19 | 10 |
| 169 | 155 | 129 | 115 | 73 | 43 | 34 | 26 | 18 | 9 |
| 171 | 155 | 135 | 123 | 77 | 43 | 35 | 26 | 18 | 9 |
| 168 | 153 | 140 | 130 | 80 | 43 | 34 | 26 | 18 | 10 |
| 166 | 169 | 170 | 170 | 76 | 12 | 10 | 10 | 10 | 10 |

*Fig. 7D*

LOCATION PREDICATIVE RESTORATION OF COMPRESSED IMAGES STORED ON A HARD DISK DRIVE WITH SOFT AND HARD ERRORS

BACKGROUND OF THE INVENTION

1. Field of the Invention

The present invention generally relates to processing of multimedia data. More particularly, the present invention relates to location-predictive restoration of flawed multimedia image data stored on a hard disk drive.

2. Description of the Related Art

The e-commerce market is expanding rapidly, and the demands for faster e-commerce servers are increasing correspondingly. The growth of customer transaction volume demands reliable and expedient performance from the computer systems that support the e-commerce traffic. For example, a customer accessing an online catalog expects and demands that detailed product information, such as representative images, are displayed immediately at the customer's request. Any delays by the server system in processing the customer request (e.g., displaying a representative image of a product) may cause customer dissatisfaction with the online shopping experience, potentially resulting in loss of customers.

Data for online catalogs, order/shipping data and multimedia data, including data for images, video and sound, are typically stored on storage devices, such as data server systems having Redundant Arrays of Inexpensive Disks (RAID), connected to a host server system. RAID data storage systems typically include a plurality hard disk drives (HDDs). Currently, all HDDs include built-in error-correcting-code (ECC) apparatus that handles most errors in the readback process. Occasionally, some errors cannot be corrected by the ECC apparatus during an initial readback process, and a prescribed data recovery procedure (DRP) for the HDD is performed to recover the data from the HDD.

The DRP is a time consuming process for correcting data readback errors. Performance of the HDD may be severely degraded by the time required for performing the DRP, even for correcting a soft error (i.e., an error that can be corrected by performing the DRP) which eventually yields recovered data. However, when a hard error (i.e., an error that cannot be corrected by performing the DRP) occurs, time is wasted for performing the DRP while the readback error remain uncorrected. Furthermore, when a hard error occurs while reading data for an image, the whole image or portions of the image may be corrupted and become undisplayable, resulting in customer dissatisfaction with the online experience.

Most multimedia data are stored in compressed form to facilitate efficient usage of the storage space. Still images are typically stored utilizing JPEG (Joint Photographic Experts' Group) compression method while videos are typically stored utilizing MPEG (Moving Picture Experts' Group) compression method. Compressed data is decompressed after the data is readback from the HDD. Many steps utilized for MPEG compression/decompression of an individual video frame are similar to the steps utilized for JPEG compression/decompression of a still image.

Generally, the JPEG compression process includes the following steps. First, an image in raster order comprising an N1×N2 pixel-matrix (image-matrix) is divided into a plurality of 8×8 subimages (i.e., 8 pixel by 8 pixel subimages or blocks). Second, the N1×N2 pixel-matrix in the spatial domain is transformed into an N1×N2 coefficient matrix in the frequency domain utilizing discrete cosine transformation (DCT). JPEG compression is typically performed in the frequency domain. Third, The DCT coefficients in the N1×N2 coefficient matrix are quantized or truncated. Next, the quantized DCT coefficients are scanned, and descriptors are formed for the quantized DCT coefficients. Lastly, the data is entropy-encoded utilizing variable length lossless coding of the digital representation to reduce redundancy, which results in compressed data. The compressed data is then transmitted to and stored in storage devices.

The JPEG decompression process reverses the steps performed in the compression process to render an image from compressed data. First, the compressed data readback from storage devices is entropy-decoded utilizing variable length lossless decoding. Second, the descriptors are decoded, and the 8×8 blocks of quantized DCT coefficients are re-formed. Third, all 8×8 blocks of quantized DCT coefficients are dequantized. Next, an inverse DCT is applied to the DCT coefficients to transform the 8×8 blocks of DCT coefficients to 8×8 pixel subimages. Lastly, the 8×8 pixel subimages are converted to raster order, and the decompressed image (N1×N2 pixels) may then be displayed.

The compression/decompression processes involve index mapping of an N1×N2 pixel image into i by j subimages. The i by j subimages are stored sequentially and readback sequentially. FIG. 1 is a schematic diagram illustrating typical index mapping of an N1×N2 pixel image into i by j subimages. Each subimage (i,j) is a 8×8 pixel block, and both N1 and N2 are integer values which are divisible by 8. Thus, the N1×N2 pixel image is divided into i (N1 divided by 8) rows and j (N2 divided by 8) columns. The data representing the i by j subimages are stored sequentially in a data storage sequence ($IM_{typical}$) defined as in Equation (1).

$$IM_{typical} = (1,1),(1,2), \ldots (1,j),(2,1),(2,2), \ldots (2,j), \ldots, (i,1),(i,2), \ldots (i,j) \quad \text{Equation (1)}$$

If any portion of the data storage sequence is stored on a flawed portion of the HDD where a hard disk error results, the whole image or a series of consecutive or adjacent subimages may become unrecoverable and undisplayable. The time spent performing the HDD's data recovery procedure is wasted without improving the corrupted image.

Therefore, there is a need for a multimedia data processing method which improves server performance in rendering multimedia data. Particularly, there is a need for a method for processing multimedia data without requiring utilization of the hard disk drive's data recovery procedure when soft or hard errors are encountered in connection with reading of the multimedia data from the hard disk drive.

SUMMARY OF THE INVENTION

Embodiments of the present invention generally provide method, apparatus and signal bearing medium for processing multimedia data which improve server performance in rendering multimedia data. In one aspect, a method is provided for processing multimedia data without requiring utilization of the hard disk drive's data recovery procedure when soft or hard errors are encountered in connection with reading of the multimedia data from the hard disk drive.

One embodiment of the invention provides a method for processing multimedia data comprising: indexing the multimedia data to an i by j matrix; storing the i by j matrix in a data storage device utilizing odd/even index sequencing of the i by j matrix; retrieving data from the data storage device; and reconstructing the i by j matrix utilizing odd/even index sequencing of retrieved data.

Another embodiment of the invention provides a signal bearing medium, comprising a program which, when executed by a processor, performs a method comprising: indexing the multimedia data to an i by j matrix; storing the i by j matrix in a data storage device utilizing odd/even index sequencing of the i by j matrix; retrieving data from the data storage device; and reconstructing the i by j matrix utilizing odd/even index sequencing of retrieved data.

In another aspect, a server system for processing multimedia data is provided. The server system comprises: a processor; a memory connected to the processor; and one or more storage devices for storing multimedia data connected to the processor, wherein the processor is configured to perform a method for processing multimedia data, the method comprising: indexing the multimedia data to an i by j matrix; storing the i by j matrix in a data storage device utilizing odd/even index sequencing of the i by j matrix; retrieving data from the data storage device; and reconstructing the i by j matrix utilizing odd/even index sequencing of retrieved data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 4A-D are schematic diagrams illustrating one embodiment of an odd/even index mapping.

FIGS. 7A-D are schematic diagrams illustrating one embodiment of a linear row/column interpolation process for calculating replacement values for pixel data for a subimage contained in a flawed logic block.

DETAILED DESCRIPTION OF THE PREFERRED EMBODIMENT

Embodiments of the present invention generally provide method and apparatus for processing multimedia data which improve server performance in rendering multimedia data. In one aspect, a method is provided for processing multimedia data without requiring utilization of the hard disk drive's data recovery procedure when soft or hard errors are encountered in connection with reading of the multimedia data from the hard disk drive.

One embodiment of the invention is implemented as a program product for use with a computer system such as, for example, the client/server network environment 200 shown in FIG. 2 and described below. The program(s) of the program product defines functions of the embodiments (including the methods described below with reference to FIGS. 3, 5 and 6) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figures 1, 2:
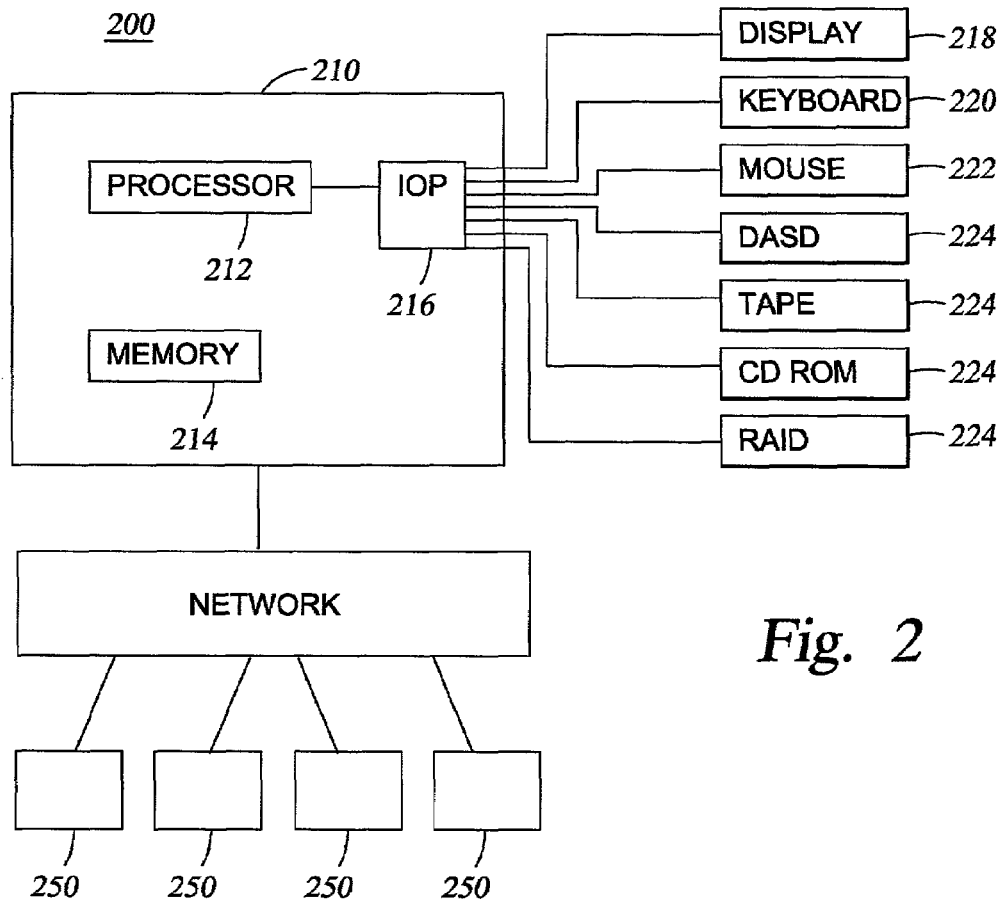
FIG. 1 is a schematic diagram illustrating typical index mapping of a N1×N2 pixel image into i by j subimages.
FIG. 2 is a schematic illustration of one embodiment of a computer system for processing multimedia data.

FIG. 2 is a schematic illustration of one embodiment of a computer system for processing multimedia data. The computer system 200, as shown in FIG. 2, is a client/server system having a host server 210 and one or more clients 250 disposed in connection with the host server 210 through a network. The host server 210 includes one or more processors 212, memory 214, and an I/O (input/output) processor 216. Input/output devices such as a display monitor 218, a keyboard 220, and a pointing device 222 (e.g., mouse) are connected to the host server 210 through the I/O processor 216. One or more storage devices 224, such as RAID systems, direct access storage devices (DASD), tape storage devices, CD-ROM (compact disc read only memory), and other optical or magnetic storage devices, may be connected to the host server 210 through the I/O processor 216. Data files, software programs, and other information may be stored on the storage devices 224.

One or more software programs, such as a host server operating system (e.g., IBM OS/400) and a host server administration software program, may be stored in memory 214 or alternatively, in the storage devices 224. Operation of the host server operating system and the host server 210 may be controlled by user input through I/O devices such as the keyboard 220 and the pointing device 222. Other software programs, such as a program for processing multimedia data, as described in embodiments of the invention, may also be stored in memory 214 or alternatively, in the storage devices 224.

A plurality of clients 250 (e.g., client computers and network stations) may be connect to the host server 210 and/or the network servers 230 through local area networks, wide area networks, and remote access connections. The clients 250 may communicate through TCP/IP (Transfer Control Protocol/Internet Protocol) with the server 210. The clients 250 may request a multimedia image from the server 210 which may trigger performance of a multimedia data retrieval process from the storage devices 224 connected to server 210 according to embodiments of the invention.

Figure 3:
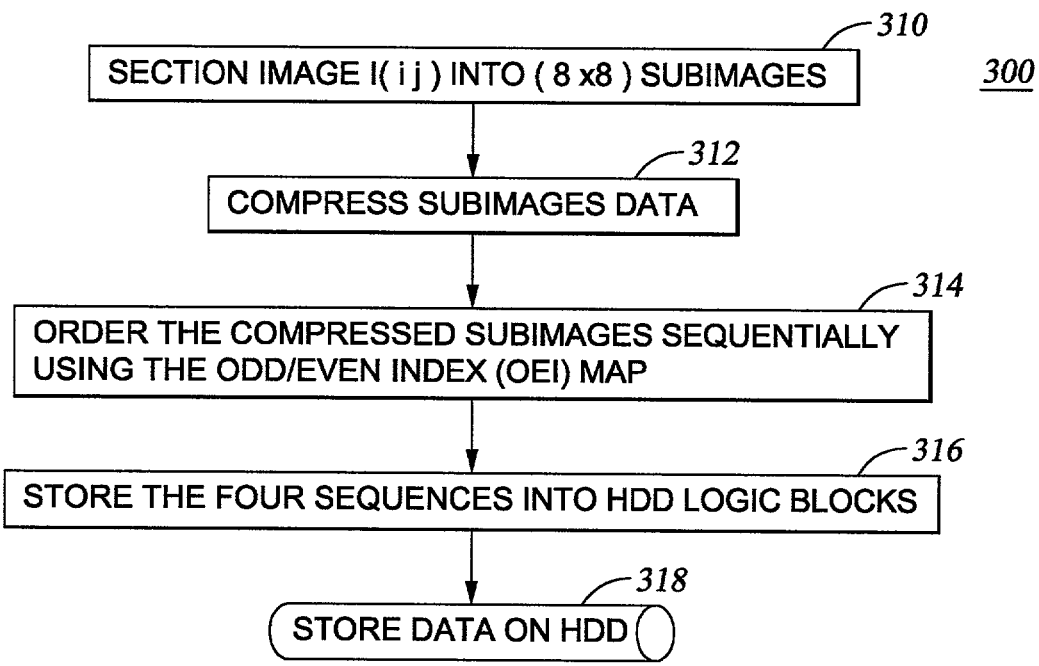
FIG. 3 is a flow chart illustrating one embodiment of a method for storing multimedia data utilizing odd/even index sequencing.

FIG. 3 is a flow chart illustrating one embodiment of a method for storing multimedia data utilizing odd/even index sequencing. Although the embodiments described below processes data for a still image, it is understood that other multimedia data, including video and sound data, may be processed similarly and are contemplated by the present invention. The method 300 for storing multimedia data utilizing odd/even index sequencing may be performed on image data for an image I(i,j) to be stored on a HDD. The image I(i,j) includes $i_p$ rows of pixels and $j_p$ columns of pixels (e.g., $i_p$ and $j_p$ may be integers which are divisible by 8). The method 300 begins at step 302 and proceeds to step 310 wherein the image I(i,j) is sectioned into 8 pixel by 8 pixel subimages. As illustrated in FIG. 1, the image I(i,j) is sectioned into i by j subimages (i.e., i rows times j columns of subimages). For illustrative purposes, i and j are assumed to be even numbers. Next at step 312, the i by j subimages are compressed utilizing a image data compression method, such as the JPEG compression method which compresses each i by j subimages individually instead of compressing the image I(i,j) as a single whole image. Then at step 314, the compressed data for the i by j subimages are ordered sequentially utilizing an odd/even index (OEI) mapping as described in FIGS. 4A-D and Table I.

FIGS. 4A-D are schematic diagrams illustrating one embodiment of an odd/even index mapping. FIG. 4A illustrates subimages $(i_{odd}, j_{odd})$ for odd rows and odd columns of the i by j subimages. FIG. 4B illustrates subimages $(i_{odd}, j_{even})$ for odd rows and even columns of the i by j subimages. FIG. 4C illustrates subimages $(i_{even}, j_{odd})$ for even rows and odd columns of the i by j subimages. FIG. 4A illustrates subimages $(i_{even}, j_{even})$ for even rows and even columns of the i by j subimages. In one embodiment, the compressed data for the i by j subimages are ordered and stored sequentially in the following order: Odd/Odd, Odd/Even, Even/Odd, and Even/Even, as defined in Table I.

TABLE I

Index Sequences Utilizing OEI Mapping of i by j Subimages

| MAP | Sequential Storage Order of Subimages |
|---|---|
| Odd/Odd | (1,1), (1,3), (1,5), . . . , (1,j-1), (3,1), (3,3), (3,5), . . . , (3,j-1), . . . , (5,1), (5,3), (5,5), . . . , (5,j-1), . . . , (i-1,1), (i-1,3), (i-1,5), . . . (i-1,j-1) |
| Odd/Even | (1,2), (1,4), . . . , (1,j), (3,2), (3,4), . . . , (3,j), (5,2), (5,4), . . . , (5,j), . . . , (i-1,2), (i-1,4), . . . , (i-1,j) |
| Even/Odd | (2,1), (2,3), (2,5), . . . , (2,j-1), (4,1), (4,3), (4,5), . . . , (4,j-1), . . . , (i,1), (i,3), (i,5), . . . (i,j-1) |
| Even/Even | (2,2), (2,4), . . . , (2,j), (4,2), (4,4), . . . , (4,j), . . . , (i,2), (i,4), . . . , (i,j) |

Continuing on to step 316, the data in the four sequences of the OEI mapping are stored into HDD logic blocks. In one embodiment, data for each of the four sequences are stored in one or more logic blocks, and none of the sequences share the same logic block. Thus, if any one of the logic blocks fail during a HDD readback process, only one sequence or a portion of one sequence is affected. In another embodiment, if each sequence is stored in more than one logic block, the end portion of one sequence may share a logic block with the front portion of the next sequence. To complete the method 300, the compressed data is written/stored onto the HDD at step 318. The computations involved in step 310, 312, 314, and 316 may be performed by the processor of the server system to which the HDD storage device is connected.

Figure 5:
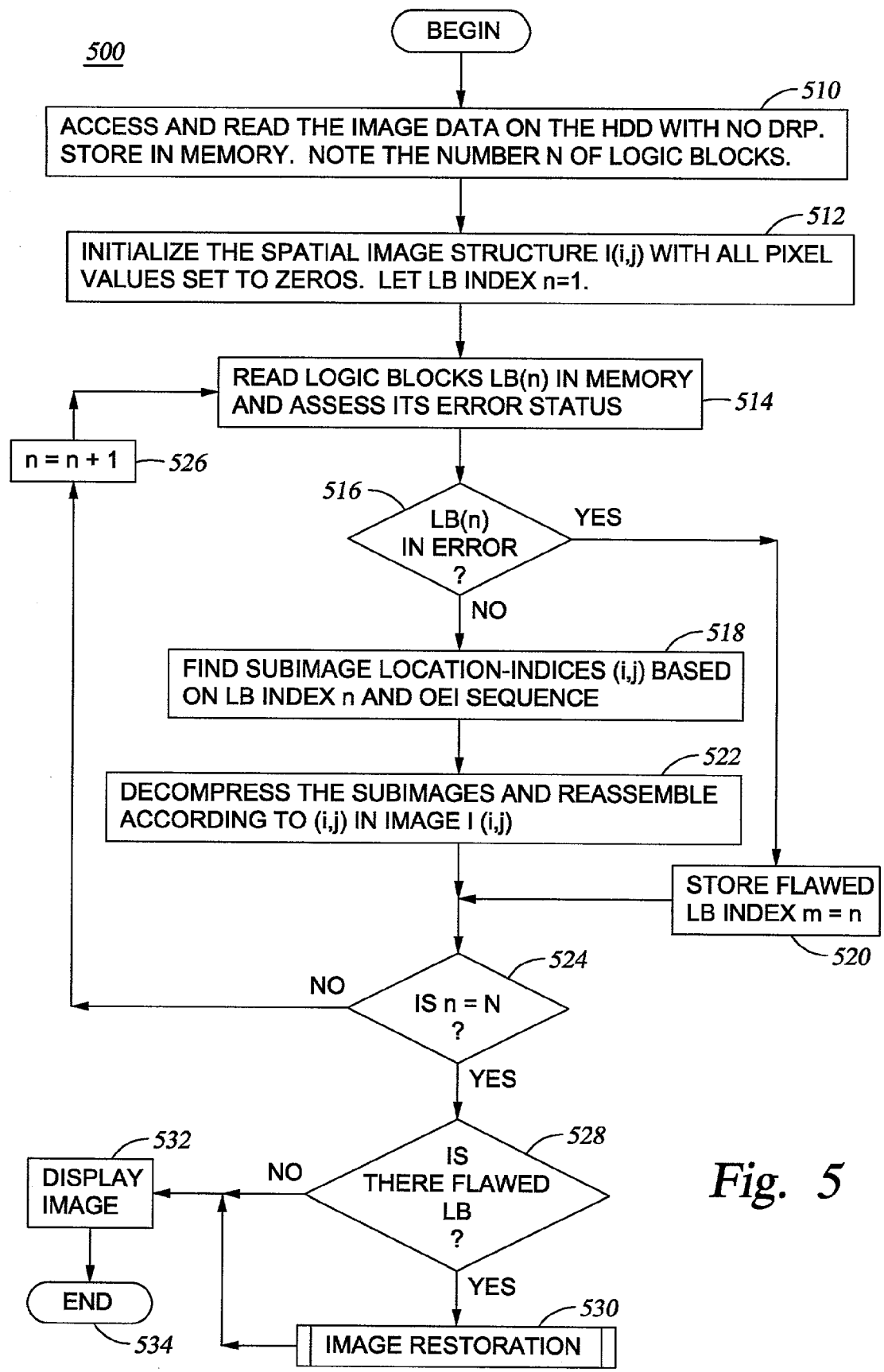
FIG. 5 is a flow chart illustrating one embodiment of a method for retrieving multimedia data utilizing inverse odd/even index sequencing.

FIG. 5 is a flow chart illustrating one embodiment of a method for retrieving multimedia data utilizing inverse odd/even index sequencing. The method 500 begins at step 502 and proceeds to step 510 to access and read the image data on the HDD. The HDD's data recovery procedure is disabled during performance of the method 500. If a logic block is flawed (i.e., a soft or hard error occurred during readback of the logic block), a dummy fixed value is assigned to the portion of image data contained in the flawed logic block. The read image data is stored in temporary memory, and the number (N) of logic blocks utilized for storing the image data is counted and also stored in temporary memory. After the image data is read from the HDD and stored in temporary memory, the spatial subimage structure I(i,j) is initialized in step 512. All pixel values of the spatial subimage structure I(i,j) may be initialized with a fixed value, such as zeros. Also in this step, the LB index (logic block index) n is initialized to n=1.

Next, the logic block LB(n) is read from memory at step 514, and the error status of the logic block LB(n) is assessed at step 516. If the error status indicates no error, then the method proceeds to determine the subimage locations indices I(i,j) for the data contained in the logic block LB(n) based on the LB index number and the OEI mapping storage sequence as defined in Table I. At step 522, each subimage data contained in the logic block LB(n) is decompressed to provide the pixel values for the pixels contained in the subimage and reassembled into the spatial image structure according to the corresponding subimage location. Then, at step 524, the value n is compared to the value N to determine whether all of the N logic blocks of the stored data for the image have been processed. If more logic blocks remain to be processed, the value of n is incremented by 1 at step 526, and method 500 loops back to step 514 to process the next logic block.

Referring back to the decision box at step 516, if an error of the logic block is identified, the value n of the flawed logic block LB(n) is stored in memory as flawed LB index m at step 520. The method 500 then proceeds to step 524 to determine whether all of the N logic blocks of the stored data for the image have been processed. If more logic blocks remain to be processed, the value of n is incremented by 1 at step 526, and method 500 loops back to step 514 to process the next logic block.

Once all of the logic blocks of the stored data for the image have been processed, as determined in step 524, the method 500 determines whether a flawed logic block had been identified at step 528. If no flawed logic block had been identified, the completely reassembled image is displayed at step 532, and the method 500 ends at step 534.

Figure 8A:
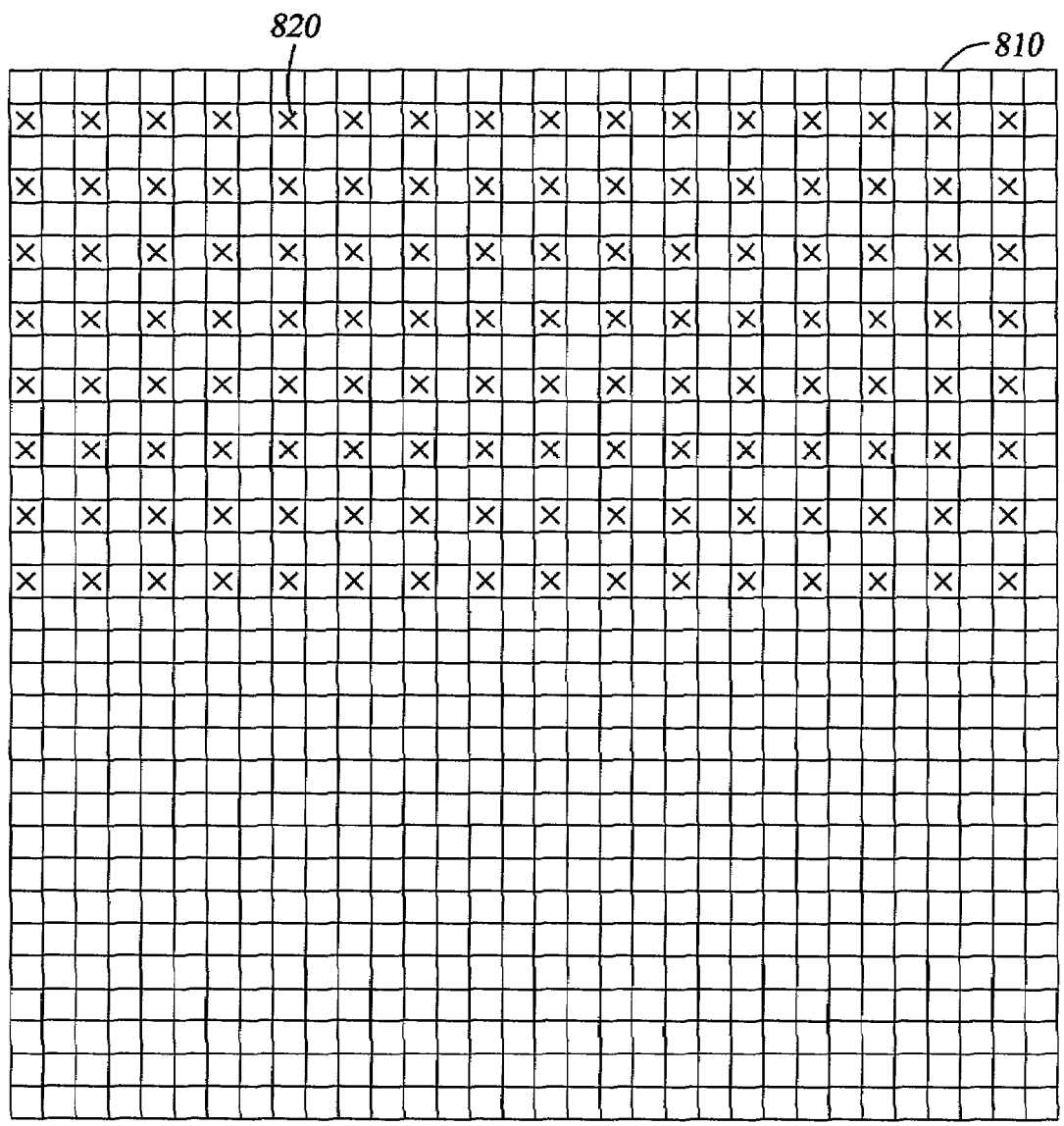
FIGS. 8a and 8b are schematic illustrations of a decompressed image having a flawed logic block.
Figure 8B:
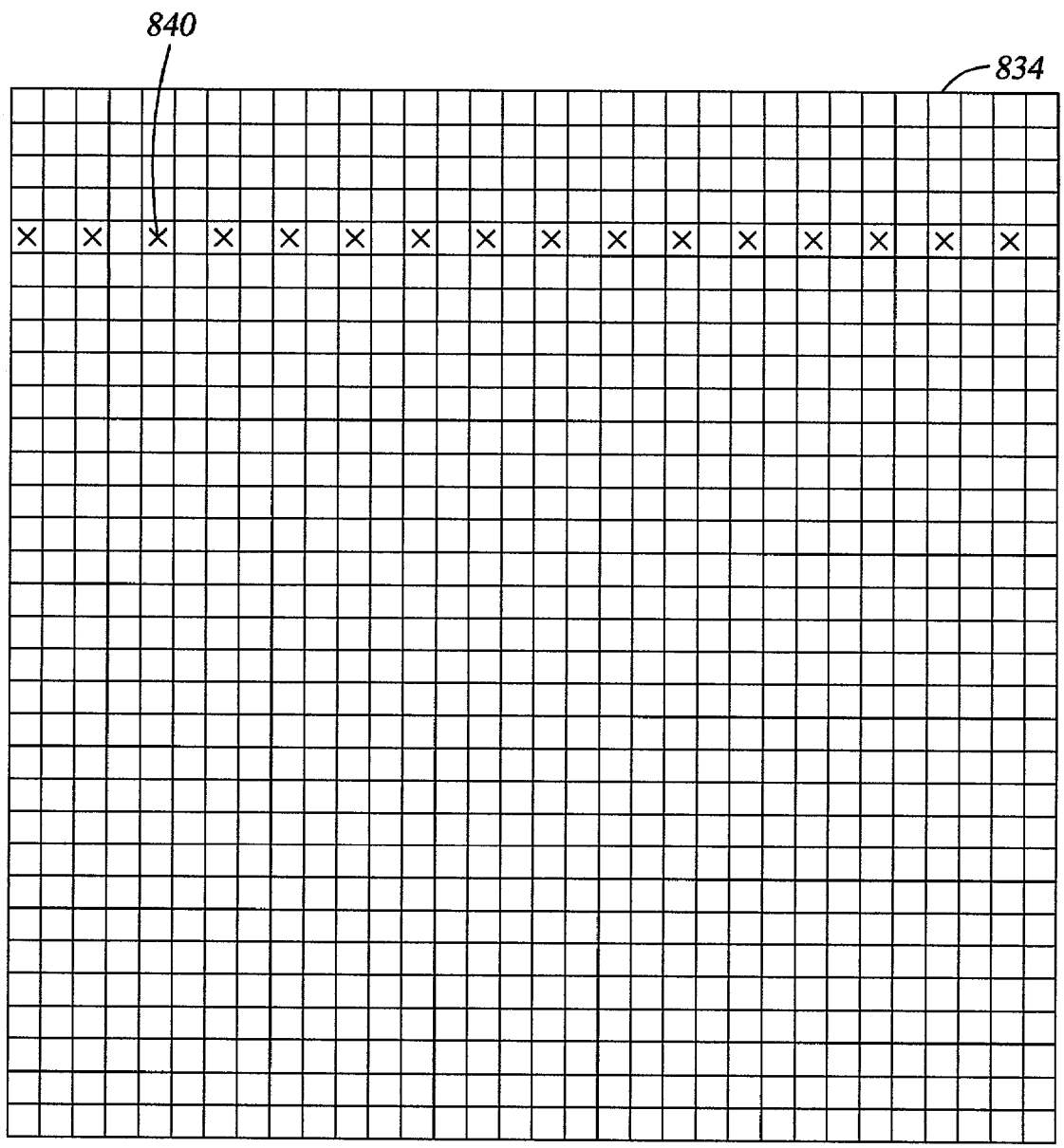

If a flawed logic block had been identified, an image restoration process is performed at step 530 to calculate replacement pixel values for the subimages contained in the flawed logic block. FIGS. 8a and 8b are schematic illustrations of a decompressed image having a flawed logic block. For illustration purposes, the images in FIGS. 8a and 8b are 256×256 pixel images having 8×8 pixel subimages, and the images have a 256-level gray scale. The image data is compressed by a 16:1 ratio, and the compressed data is mapped into the four sequences according to the OEI mapping described above regarding Table 1.

The logic blocks in FIG. 8a are defined as 512-Byte blocks, and a total of eight logic blocks (i.e., LB(n) where n=1 to 8) are utilized to store the image data. Two logic blocks are utilized to store each of the four OEI sequences defined in Table 1. FIG. 8*a* illustrates a decompressed image 810 having LB(5) being a flawed logic block. The flawed logic block LB(5) contains data for subimages for the first half of the Even/Odd sequence (i.e., subimages (2,1), (2,3), ... (2,31), ... (4,1), (4,3), ... (4,31), ... (16,1), (16,3), ... (16,31)). The flawed subimages 820 are shown as x-out squares.

The size of the logic block may be defined to reduce the number of subimages affected by a single flawed logic block. For example, for logic blocks defined as 64-Byte blocks, a total of 64 logic blocks are utilized to store the image data for a 256-level gray scale, 256×256 pixel image having 8×8 pixel subimages. Sixteen logic blocks are utilized to store each of the four OEI sequences defined in Table 1, and each logic block contains the data for alternating subimages in one row of subimages.

FIG. 8*b* illustrates a decompressed image 830 having LB(3) being a flawed logic block. As illustrated in FIG. 8*b*, the flawed logic block LB(3) contains data for subimages for a portion of the Odd/Odd sequence (i.e., subimages (5,1), (5,3), ... (5,31)). The flawed subimages 840 are shown as x-out squares. The image restoration process is performed for a substantially less number of subimages (i.e., 16 subimages versus 128 subimages) for each flawed logic block when the size of the logic block is reduced.

Figure 6:
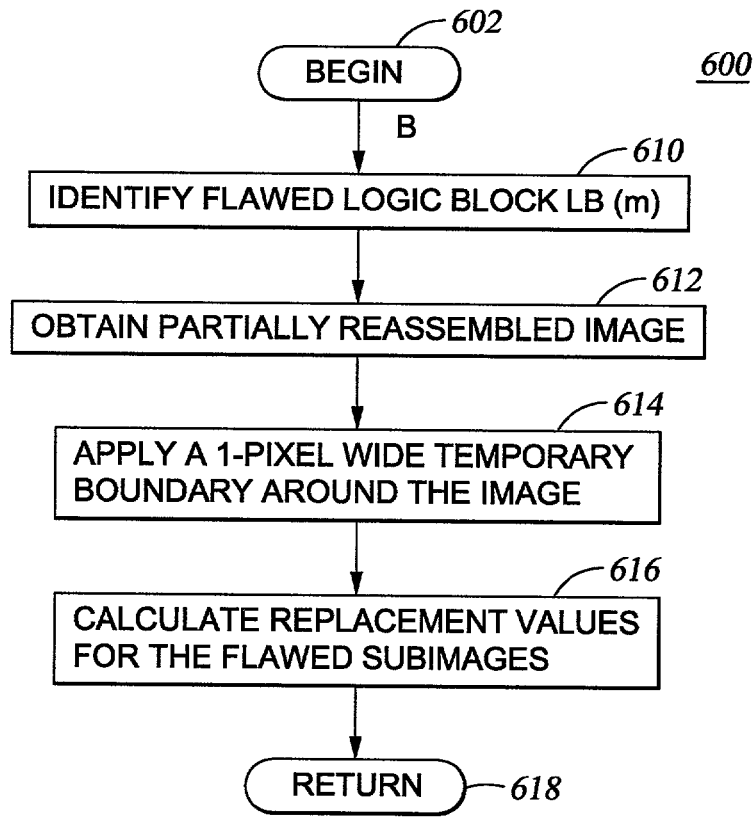
FIG. 6 is a flow chart illustrating one embodiment of a method for restoring an image.

FIG. 6 is a flow chart illustrating one embodiment of a method for restoring an image. The method 600 provides spatial reconstruction of flawed subimages and begins at step 602. At step 610, the flawed logic block LB(m) is identified, and the flawed subimages are also determined based on the LB index number and the OEI mapping storage sequence as defined in Table I. If more than one logic block is flawed, the method 600 is repeated for each flawed logic block LB(m). At step 612, pixel data for the partially reassembled image is obtained from the result of processing all non-flawed logic blocks (i.e., after step 524). At step 614, a temporary one-pixel wide boundary is applied around the partially reassembled image. The pixel value of the boundary may be a fixed value, such as a median value of 128 for a 256 level gray scale image. The temporary boundary may be utilized as local boundary conditions for flawed subimages adjacent the image boundary when applying a linear row/column interpolation to calculate replacement values for the flawed subimage pixel values. At step 616, replacement values are calculated for the flawed subimages. In one embodiment, a linear row/column interpolation is performed for each flawed subimage to calculate replacement pixel values.

FIGS. 7A-D are schematic diagrams illustrating one embodiment of a linear row/column interpolation process for calculating replacement values for pixel data for a subimage contained in a flawed logic block. FIG. 7A illustrates a flawed subimage represented by x's and the surrounding pixel values that may be utilized for the row/column interpolation process. FIG. 7B illustrates linear row-interpolation values for the flawed subimage pixels. FIG. 7C illustrates column-interpolation values for the flawed subimage pixels. FIG. 7D illustrates the results of in-place averaging of the linear row-interpolation values and the column-interpolation values for the flawed subimage pixels. Replacement pixel values may be calculated for each flawed subimage similarly to the example shown in FIGS. 7A-D.

The method 600 ends at step 618 after all replacement values have been calculated for each flawed subimage and returns to the process of FIG. 5. After interpolating each flawed subimages, the reconstructed image is displayed at step 532, and the method 500 ends at step 534. Although one embodiment of the image restoration process is described utilizing a linear row/column interpolation method, other interpolation, reconstruction, or restoration method are contemplated by the inventors for calculating replacement values for the flawed subimages.

Embodiments of the invention utilizes a spatially interleaved image mapping of sectioned subimages in connection with the HDD logic blocking structure to provide data replacement when soft or hard errors occur in one or more logic blocks, without utilizing the built-in data recovery procedures in the HDD. The restoration operation is location-predicative because the index mapping provide the exact spatial locations of flawed subimages contained in flawed logic block(s). Embodiments of the present invention may be converted in application to process images without compression and decompresson. Embodiments of the invention also facilitate use of hard disk drives having higher densities and higher data error rates than the hard disk drives used for alphanumeric data since the logic block length may be shortened to allow for increased LB errors per image while providing ability to reconstruct replacement pixel values. Thus, hard disk drives dedicated for storing multimedia data may be less costly yet provide more efficient performance.

While the foregoing is directed to embodiments of the present invention, other and further embodiments of the invention may be devised without departing from the basic scope thereof, and the scope thereof is determined by the claims that follow.

What is claimed is:

1. A method for processing multimedia data, comprising: indexing the multimedia data to an i by j matrix; and storing a plurality of odd/even index sequences of the i by j matrix on a hard disk drive having a plurality of logic blocks, wherein at least two odd/even index sequences are stored in separate logic blocks of the hard disk drive.

2. The method of claim 1 wherein the multimedia data is selected from still image data and video image data.

3. The method of claim 1 wherein the multimedia data represents an image having i times j pixels.

4. The method of claim 1 wherein the multimedia data represents an image having i times j subimages and wherein the i by j matrix corresponds to the i times j subimages.

5. The method of claim 1 wherein the plurality of odd/even index sequences comprises an odd/odd index sequence an odd/even index sequence, an even/odd index sequence, and an even/even index sequence.

6. The method of claim 5 wherein the index sequences are stored in logic blocks on the hard disk drive and wherein each of the index sequences is separately stored in respective logic blocks.

7. The method of claim 5 wherein each index sequence is stored in one or more logic blocks on the hard disk drive and wherein each logic block contains portions of at most two different index sequences.

8. The method of claim 1, further comprising:
retrieving data comprising the stored index sequences from the hard disk drive; and
reconstructing the i by j matrix utilizing odd/even index sequencing of the retrieved data.

9. The method of claim 8, further comprising, prior to retrieving data, disabling a data recovery procedure programmed on the hard disk drive.

10. The method of claim 8, wherein the multimedia data represents an image having i times j subimages and wherein the i by j matrix corresponds to the i times j subimages; further comprising:
compressing the subimages before storing the i by j matrix on the hard disk drive; and
decompressing the reconstructed i by j matrix to render the image.

11. The method of claim 8,
wherein the plurality of odd/even index sequences comprises an odd/odd index sequence, an odd/even index sequence, an even/odd index sequence, and an even/even index sequence;
wherein each index sequence is stored separately in one or more logic blocks on the hard disk drive;
wherein the reconstructing step further comprises, when a logic block is flawed, replacing data contained in one or more portions of the index sequences contained in the flawed logic block with one or more fixed values.

12. The method of claim 8,
wherein the plurality of odd/even index sequences comprises an odd/odd index sequence, an odd/even index sequence, an even/odd index sequence, and an even/even index sequence;
wherein each index sequence is stored separately in one or more logic blocks on the hard disk drive;
wherein the reconstructing step further comprises, when a logic block is flawed, interpolating one or more replacement values for one or more portions of the index sequences contained in the flawed logic block.

13. A tangible signal bearing medium, comprising a program which, when executed by a processor, performs a method comprising:
indexing the multimedia data to an i by j matrix; and
storing a plurality of odd/even index sequences of the i by j matrix on a hard disk drive having a plurality of logic blocks, wherein at least two odd/even index sequences are stored in separate logic blocks of the hard disk drive.

14. The tangible signal bearing medium of claim 13 wherein the multimedia data represents an image having i times j subimages and wherein the i by j matrix corresponds to the i times j subimages.

15. The tangible signal bearing medium of claim 13 wherein the plurality of odd/even index sequences comprises an odd/odd index sequence, an odd/even index sequence, an even/odd index sequence, and an even/even index sequence.

16. The tangible signal bearing medium of claim 15 wherein each index sequence is stored in one or more logic blocks on the hard disk drive and wherein each logic block contains portions of at most two different index sequences.

17. The tangible signal bearing medium of claim 13, wherein the method further comprises:
retrieving date comprising the stored index sequences from the hard disk drive; and
reconstructing the i by j matrix utilizing odd/even index sequencing of the retrieved data.

18. The tangible signal bearing medium of claim 17, wherein the method further comprises, prior to retrieving data, disabling a data recovery procedure programmed on the hard disk drive.

19. The tangible signal bearing medium of claim 17, wherein the multimedia data represents an image having i times j subimages, wherein the i by j matrix corresponds to the i times j subimages, and wherein the method further comprises:
compressing the subimages before storing the i by j matrix on the hard disk drive; and
decompressing the reconstructed i by j matrix to render the image.

20. The tangible signal bearing medium of claim 17,
wherein the plurality of odd/even index sequences comprises an odd/odd index sequence, an odd/even index sequence, an even/add index sequence, and an even/even index sequence;
wherein each index sequence is stored separately in one or more logic blocks on the hard disk drive; and
wherein the reconstructing step of the method further comprises, when a logic block is flawed, interpolating one or more replacement values for one or more portions of the index sequences contained in the flawed logic block.

21. An apparatus for processing multimedia data, comprising:
a processor;
a memory connected to the processor; and
one or more storage devices for storing multimedia data connected to the processor, wherein The processor is configured to perform a method for processing multimedia data, comprising:
indexing the multimedia data to an i by j matrix; and
storing a plurality of odd/even index sequences of the i by j matrix on a hard disk drive having a plurality of logic blocks, wherein at least two odd/even index sequences are stored in separate logic blocks of the hard disk drive.

22. The apparatus of claim 21 wherein the plurality of odd/even index sequences comprises an odd/odd index sequence, an odd/even index sequence, an even/odd index sequence, and an even/even index sequence.

23. The apparatus of claim 22 wherein the processor is further configured to store each index sequence in one or more logic brooks on the hard disk drive and wherein each logic block contains portions of at most two different index sequences.

24. The apparatus of claim 21, wherein the processor is further configured to retrieve data comprising the stored index sequences from the hard disk drive and to reconstruct the i by j matrix utilizing odd/even index sequencing of the retrieved data.

25. The apparatus of claim 24 wherein the processor is further configured to disable a data recovery procedure programmed on the hard disk drive, prior to retrieving the data.

26. The apparatus of claim 24,
wherein the plurality of odd/even index sequences comprises an odd/odd index sequence, an odd/even index sequence, an even/odd index sequence, and an even/even index sequence:
wherein the processor is further configured to store each index sequence separately in one or more logic blocks on the hard disk drive; and
wherein, when reconstructing the matrix, the processor is further configured to interpolate one or more replacement values, when a logic block is flawed, for one or more of the index sequences contained in the flawed logic block.

27. A method for processing multimedia data, comprising:
retrieving data from a data storage device, wherein the data comprises a plurality of odd/even index sequences of an i by j matrix representing multimedia data, wherein at least two odd/even index sequences are stored in at least two respective logic blocks on a hard disk drive; and
reconstructing the i by j matrix utilizing add/even index sequencing of the retrieved data.

28. The method of claim 27, further comprising, prior to retrieving the data, disabling a data recovery procedure programmed on the hard disk drive, and wherein the reconstructing step further comprises, when a logic block is flawed, replacing data contained in one or more portions of the index sequences contained in the flawed logic block with at least one of a fixed value and an interpolated value.

* * * * *